Dec. 16, 1952 S. BENZER 2,622,117
PHOTOVOLTAIC DEVICE
Filed July 19, 1950
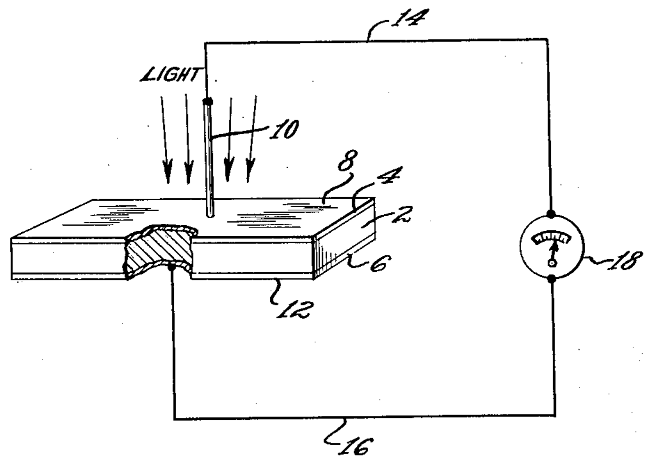
INVENTOR
Seymour Benzer
BY Morris Rahkin
ATTORNEY Patented Dec. 16, 1952 2,622,117

UNITED STATES PATENT OFFICE 2,622,117

PHOTOVOLTAIC DEVICE

Seymour Benzer, Pasadena, Calif., assignor to Purdue Research Foundation, La Fayette, Ind., a corporation of Indiana Application July 19, 1950, Serial No. 174,770

18 Claims. (Cl. 136—89)

This invention relates to a novel device capable of generating electrical currents in response to the impinging of light thereon. More particularly, the invention relates to a novel photovoltaic cell comprising a body of semi-conducting germanium having a light-transmitting film of a metal on one surface and an electrode in contact with the metal film.

Previously known photocells are of three basic types, photoconductive, photoemissive and photovoltaic. The photoconductive type cell requires an externally connected source of voltage and becomes operative when light is directed upon it. It has a relatively high internal ohmic resistance in the dark. Light directed upon it causes the lowering of the internal resistance in response to the intensity of light received. Thus, the more intense the light, the more current is permitted to flow through the cell. The selenium photoconductive cell is an example of this type. In the photoemissive type, electrons are liberated by the impinging of light. The alkali and alkaline earth metals exhibit this phenomenon to a marked extent. The photovoltaic type cell generates its own electrical current when light is directed thereon. This current can be detected by connecting an ammeter in external circuit with the cell. Previously known photocells of this latter type include such well known varieties as the copper-copper oxide cell used in photometers and the selenium cell.

Compared with previously known photovoltaic cells, such as the copper-copper oxide type, the photocell of the present invention has higher sensitivity to longer wavelengths of light. Moreover, photocells constructed according to the present invention are relatively simple to prepare and are fairly rugged as far as the surface film is concerned. They also furnish relatively strong currents under intense illumination.

One object of the present invention is to provide an improved photosensitive cell.

Another object of the invention is to provide a novel photovoltaic device of relatively high sensitivity.

Another object of the invention is to provide a novel photovoltaic cell which is of relatively rugged construction.

Another object of the invention is to provide an improved photovoltaic cell which is simple to construct and operate.

Still another object of the invention is to provide an improved photovoltaic device capable of delivering relatively high currents.

These and other objects will be more apparent and the invention will be more readily understood from a consideration of the following detail description including the drawings, the single figure of which illustrates a perspective view of one embodiment of a device constructed in accordance with the present invention.

In general, the device of the present invention comprises a body of N-type semi-conducting germanium, having one surface coated with film of a metal which is preferably below hydrogen in the electromotive series. The film may be deposited by any suitable method such as by evaporation in vacuo and should be thin enough to transmit light readily but sufficiently thick to offer practically no resistance to passage of an electric current. Electrical contact is made to the metal film by means of an electrode in firm contact with the film. Electrical contact is also made to an uncoated surface of the semi-conductor through a soldered electrode. The device may be made to serve as a light meter by connecting the electrodes to a microammeter. When the metallic film is illuminated, a current flows in the external circuit.

Referring to the single figure of the drawings, a specific embodiment of apparatus illustrative of the device of the present invention will now be described. A rectangular shaped slab of N-type germanium semi-conducting material 2 has its two major surfaces 4 and 6 preferably ground with the aid of an abrasive such as 600 mesh alumina. One of the ground surfaces 4 is then etched, for example, with hot hydrogen peroxide or a mixture of nitric and hydrofluoric acids and cupric nitrate. The particular etching process used is not cirtical. Any of the etching solutions previously used for preparing the surfaces of semi-conducting rectifiers or amplifiers can be used. The germanium semi-conducting body may be of any type exhibiting high inverse voltage N-type characteristics. For example, in co-pending application of Karl Lark-Horovitz et al., Serial No. 604,744, filed July 13, 1945, and which is now Patent 2,514,879, issued July 11, 1950, there are disclosed a number of germanium alloys having N-type characteristics. These alloys were made by alloying germanium having a purity of at least 99% with small amounts of a number of different metals or with nitrogen. Although any of these alloys may be used in the device of the present invention, it is preferred to use either a germanium-tin alloy or a germanium-nitrogen alloy. The method of preparing these alloys is fully described in the above referred to co-pending application. The germanium-nitrogen alloy is also the subject of co-pending divisional application Serial No. 66,946, filed December 23, 1948.

The germanium-tin alloy may contain tin in any amount which can be melted with germanium to form a homogeneous product. However, as described in the first of the co-pending applications above referred to, if the amount of tin is greater than about 0.1 atomic percent, the excess simply separates out as a tin-rich vein. Atomic percentages as low as 0.05 have proved practical.

In the germanium-nitrogen alloy, it has not proved possible to measure accurately the amount of nitrogen which remains alloyed with the germanium. However, by following the procedures outlined in the co-pending applications, suitable germanium-nitrogen alloys may be made.

It is also possible to produce semi-conducting germanium having regions of N-type characteristic by purifying commercially obtainable germanium or germanium dioxide and without adding alloying elements. Reference to this is contained in applicant's co-pending application, Serial No. 656,747, filed March 23, 1946, and which is now Patent 2,504,628, issued April 18, 1950, and is more fully described in applicant's co-pending application, Serial No. 642,960, filed January 23, 1946.

The ground and etched surface 4 of the germanium body is then provided with a thin, light-transmitting film 8 preferably of one of the relatively inactive metals below hydrogen in the electromotive series. The relatively inactive metals are preferred since they are less likely to oxidize and deteriorate in air. It is preferable to use a film of any of gold, silver, platinum, or copper. The film may be deposited by the well known evaporation method in vacuo. Alternatively, the film may also be deposited by chemical deposition from a solution of a salt of the metal, by electrodeposition, or even by baking a thin film of the metallic salt mixed with a reducing agent. The latter process is the same as that used in the well known processes of applying electrodes to ceramic circuit elements. There does not appear to be any critical thickness of film except that it must readily transmit light and should preferably also be thick enough to have a relatively low electrical resistance. In general, it has been found preferable to use a film which is thick enough to be translucent and cloudy.

The device also includes at least two electrodes, through one of which contact is made with the metal film 8 and through the other of which contact is made with an uncoated face of the semiconductor. Referring again to the figure, one of the electrodes 10 may comprise a metal wire having the end contacting the metal film. The wire may be of any metal such as tungsten, for example. Wires of any other ductile metal such as copper, silver, aluminum, etc., which do not oxidize rapidly in air, function equally well. The other electrode may be of relatively large area and may comprise a layer of solder 12 integrally united to the other major face 6 of the semiconductor body. A lead wire 14 may be connected to the first electrode 10 and another wire 16 may be embedded in the solder electrode 12. The two lead wires may also be connected to a suitable load such as the terminals of a microammeter 18 if it is desired, for example, to measure the current generated.

If it is desired to utilize current generated by the device to perform other functions, sensitive relays, for example, may be connected in circuit with the output leads.

The device above described is operated by directing ordinary "white" light upon the surface of the metal film over any part of or all of its surface. Current generated is proportional to the area of the film illuminated and to the intensity of the light.

For example, in a device having a film of gold, and an area of approximately 1 square cm., an ordinary household 100-watt lamp, placed about 6 inches above the surface of the film, produced currents as high as 250 microamperes. More generally, cells have been constructed having an output of 50 microamperes/lumen of white light.

Numerous changes and modifications may obviously be made in the described apparatus within the spirit of the invention, other than the variations in semi-conducting material, metal film and electrode previously indicated. The wire electrode 10, for example, may be replaced by any other suitable form of electrode making good contact with the light-transmitting film. For example, the electrode may comprise a ring of metal around the periphery of the metal film.

I claim as my invention:

1. An electrical device comprising a body of N-type semi-conducting germanium having on a surface thereof a thin light-transmitting film of a metal.

2. A device according to claim 1 in which said metal is below hydrogen in the electromotive series.

3. An electrical device comprising a body of N-type semi-conducting germanium having on a surface thereof a translucent film of a metal from the class consisting of gold, silver, platinum, and copper.

4. An electrical device comprising a body of N-type semi-conducting germanium having on a surface thereof a thin light-transmitting film of a metal from the class consisting of gold, silver, platinum, and copper, a first electrode in contact with said film, and a second electrode in contact with another surface of said body.

5. An electrical device comprising a body of semi-conducting N-type germanium material having the property of exhibiting a relatively high inverse voltage and having on a surface thereof a translucent film of a metal.

6. A device according to claim 5 in which said film is of a metal below hydrogen in the electromotive series.

7. A device according in claim 5 in which said semi-conducting material is an alloy of germanium and tin.

8. A method of making an electrical device comprising grinding and etching a surface of a body of N-type germanium semi-conducting material, and depositing on said surface a thin, light-transmitting film of a metal.

9. In a method of making an electrical device, the step of depositing on a freshly prepared surface of a body of germanium semi-conducting material a thin light-transmitting film of a metal.

10. A method according to claim 9 in which said film is deposited from the vapor phase in vacuo.

11. A method of making an electrical device comprising depositing on a surface of germanium semi-conducting body a translucent film of a metal, contacting said film with an electrode and making contact with another surface of said body with another electrode.

12. An electrical device comprising a body of semi-conducting material having on a surface thereof a thin, light-transmitting film of metal, said device also being characterized by said semi-conducting material exhibiting a relatively high inverse voltage.

13. An electrical device comprising a body of semi-conducting germanium having on a surface thereof a thin, light-transmitting film of metal.

14. A device according to claim 13 including an electrode in contact with said film, and another electrode in contact with another surface of said body.

15. A devise according to claim 14 including a utilization circuit connected to said electrodes.

16. An electrical device comprising a body of semi-conducting germanium having on a surface thereof a thin, light-transmitting film of a metal from the class consisting of gold, silver, platinum, and copper, a first electrode in contact with said film, and a second electrode in contact with another surface of said body.

17. A device according to claim 16 including a utilization circuit connected to said electrodes.

18. A method of making an electrical device comprising grinding and etching a surface of a body of germanium semi-conducting material, and depositing on said surface a thin, light-transmitting film of a metal.

SEYMOUR BENZER.

REFERENCES CITED

The following references are of record in the file of this patent:

UNITED STATES PATENTS

| Number | Name | Date |
|---|---|---|
| 2,423,476 | Billings et al. | July 8, 1947 |
| 2,504,627 | Benzer | Apr. 18, 1950 |
| 2,505,633 | Whaley | Apr. 25, 1950 |
| 2,514,879 | Lark-Horovitz | July 11, 1950 |

OTHER REFERENCES

Jaffee: Transactions Electrochemical Society, vol. 89, 1946, pages 277–289.

Dunlop: General Electric Review, February 1949, pages 9–17.

Physical Review, pages 689–690, February 15, 1949, vol. 75, #4, by J. N. Shire.